United States Patent
McCloud

(10) Patent No.: US 10,894,938 B1
(45) Date of Patent: Jan. 19, 2021

(54) DEVICE FOR TILTING A CARBOY

(71) Applicant: John Edwin McCloud, Wickliffe, OH (US)

(72) Inventor: John Edwin McCloud, Wickliffe, OH (US)

( * ) Notice: Subject to any disclaimer, the term of this patent is extended or adjusted under 35 U.S.C. 154(b) by 0 days.

(21) Appl. No.: 16/842,452

(22) Filed: Apr. 7, 2020

Related U.S. Application Data

(60) Provisional application No. 62/831,113, filed on Apr. 8, 2019.

(51) Int. Cl.
  *A47B 73/00* (2006.01)
  *C12H 1/06* (2006.01)
  *B65G 1/02* (2006.01)

(52) U.S. Cl.
  CPC ............. *C12H 1/06* (2013.01); *A47B 73/00* (2013.01); *B65G 1/02* (2013.01)

(58) Field of Classification Search
  CPC .............. C12H 1/06; A47B 73/00; B65G 1/02
  USPC .......................................................... 414/781
  See application file for complete search history.

(56) References Cited

U.S. PATENT DOCUMENTS

| | | |
|---|---|---|
| 395,504 A | 1/1889 | Nason |
| 480,095 A * | 8/1892 | Holme ................... B65G 65/24 248/143 |
| 1,357,646 A | 11/1920 | Miller |
| 1,727,523 A | 9/1929 | Schwenk |
| 2,745,616 A | 5/1956 | Gomes |
| 4,003,503 A | 1/1977 | Aldridge |
| 4,118,002 A * | 10/1978 | Bartlett ................... A47L 11/34 15/321 |
| 4,217,013 A | 8/1980 | Herrington et al. |
| 4,317,551 A * | 3/1982 | Bishop ................... B65G 65/24 211/81 |
| 4,944,477 A | 7/1990 | Hendren |
| 5,316,248 A * | 5/1994 | Allen ........................ B62B 1/16 248/129 |
| 5,839,711 A | 11/1998 | Bieck et al. |
| 5,890,686 A | 4/1999 | Morales |
| 6,575,413 B1 | 6/2003 | Straub |
| 7,018,155 B1 * | 3/2006 | Heberling ............. B62B 3/0606 414/408 |
| 7,172,165 B1 | 2/2007 | Young |
| 7,455,068 B2 | 11/2008 | Meissner et al. |
| 7,494,097 B2 | 2/2009 | Lidie et al. |
| 7,753,629 B1 | 7/2010 | McCulloch |
| 9,593,801 B2 | 3/2017 | Love |
| 2004/0177864 A1 | 9/2004 | Segalla |
| 2007/0090071 A1 | 4/2007 | Campbell |

(Continued)

*Primary Examiner* — Lynn E Schwenning
(74) *Attorney, Agent, or Firm* — The Law Office of Patrick F. O'Reilly III, LLC

(57) ABSTRACT

A device for tilting a carboy is disclosed herein. The device includes an L-shaped body portion configured to receive a carboy thereon, the L-shaped body portion including a platform base and an upright support connected to one end of the platform base, the platform base configured to support a bottom wall of the carboy, and the upright support configured to support a side wall of the carboy; and a leg structure adjustably coupled to the L-shaped body portion, the leg structure including one or more downwardly extending legs, and the leg structure configured to be slidably adjustable relative to the L-shaped body portion so as to accommodate carboys of different sizes in tilted positions.

17 Claims, 7 Drawing Sheets

(56) References Cited

U.S. PATENT DOCUMENTS

| | | |
|---|---|---|
| 2007/0199199 A1 | 8/2007 | Lake et al. |
| 2015/0027504 A1 | 1/2015 | Milroy |
| 2015/0128809 A1 | 5/2015 | Hansmann et al. |
| 2017/0050764 A1 | 2/2017 | Caul, III |
| 2017/0066462 A1* | 3/2017 | Wright ................ A61G 7/1059 |

* cited by examiner

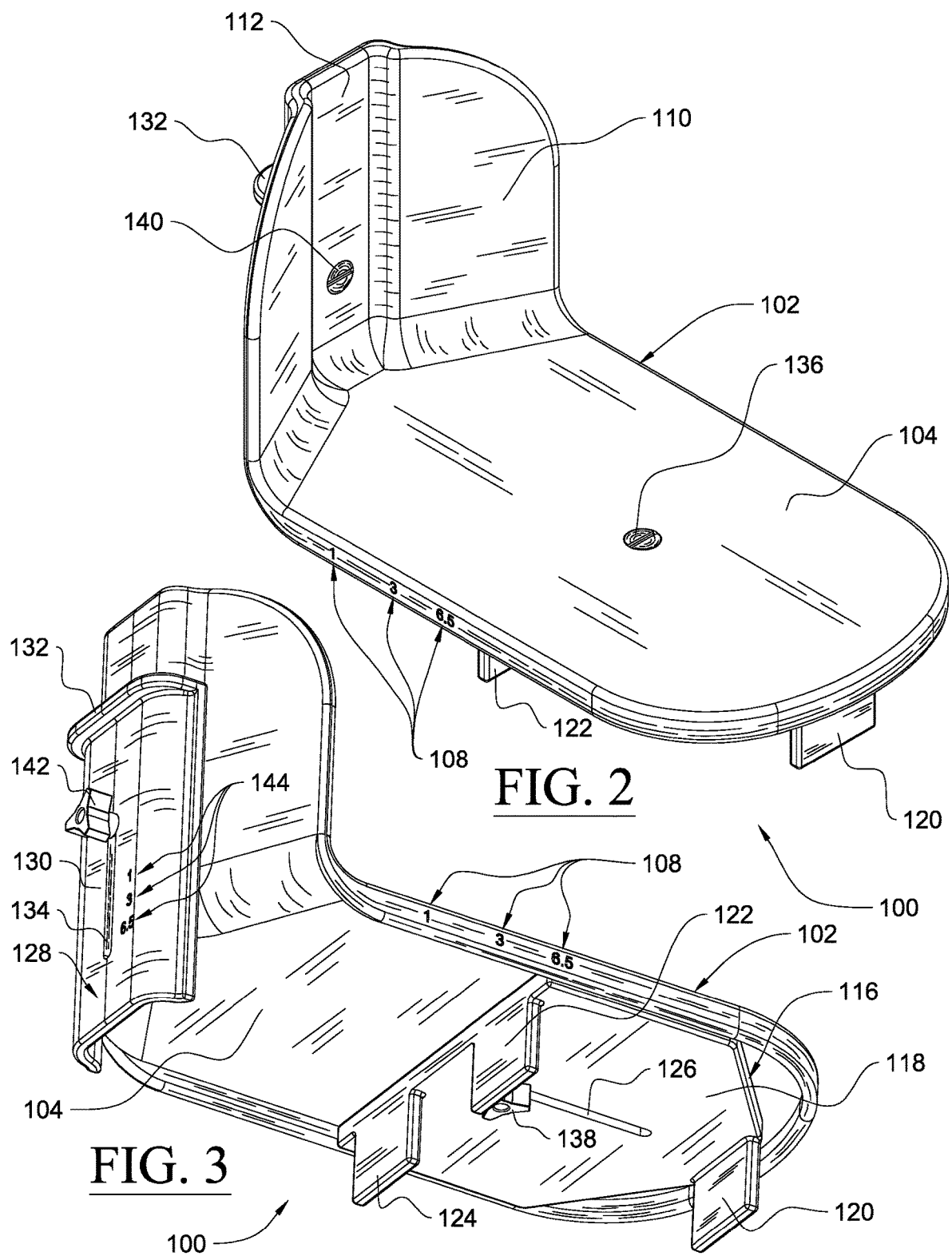

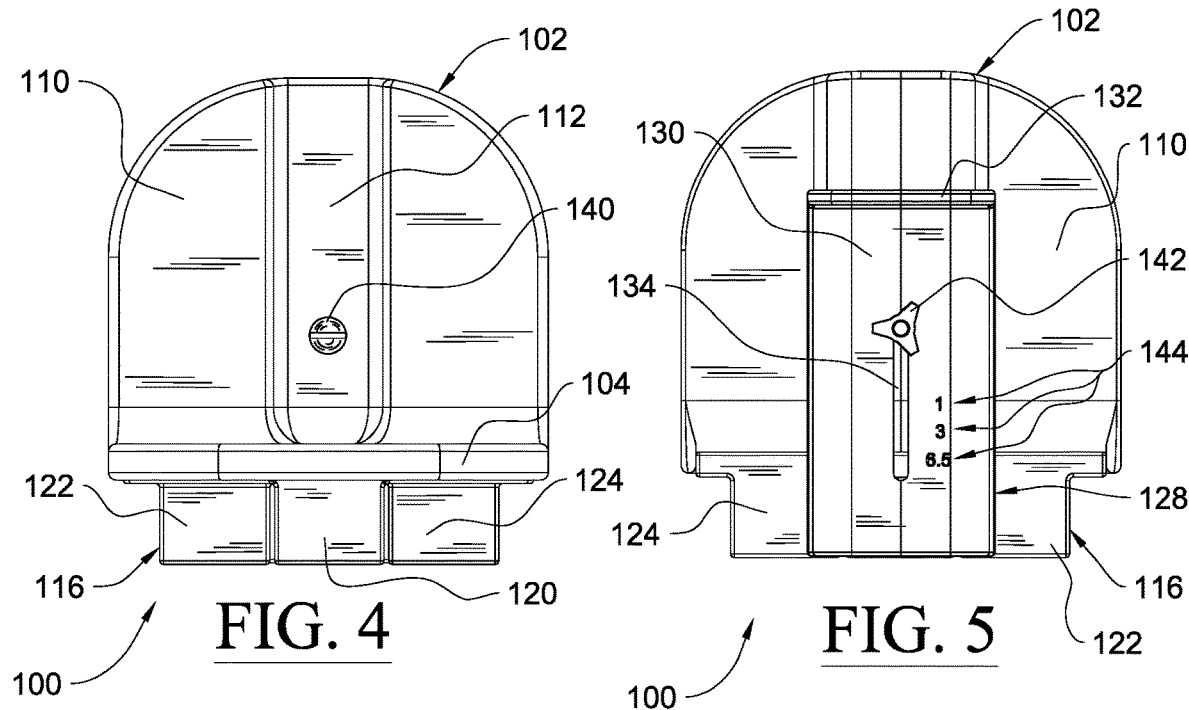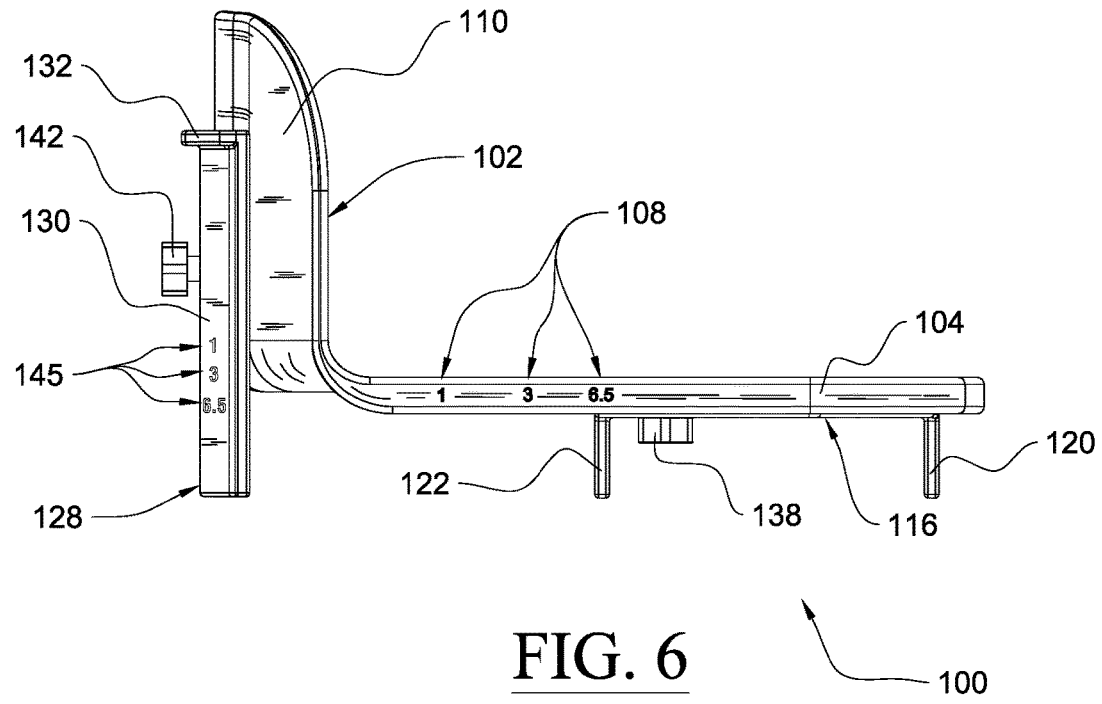

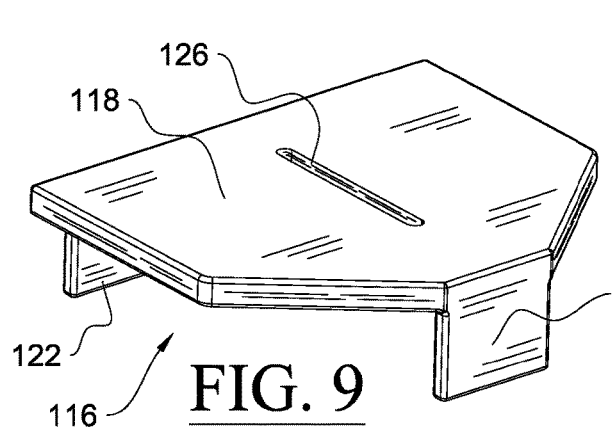
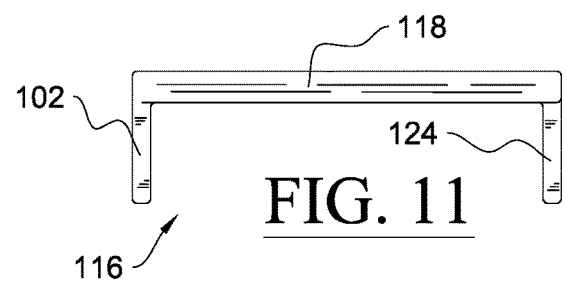
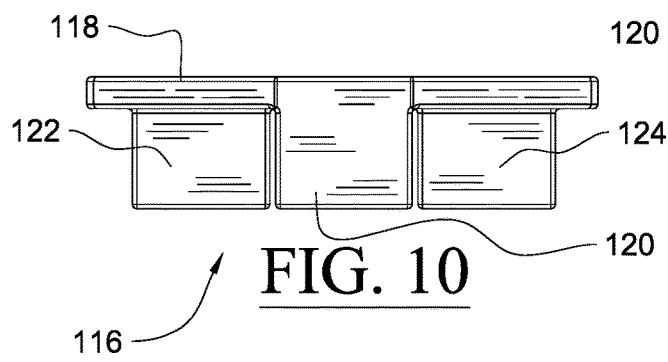
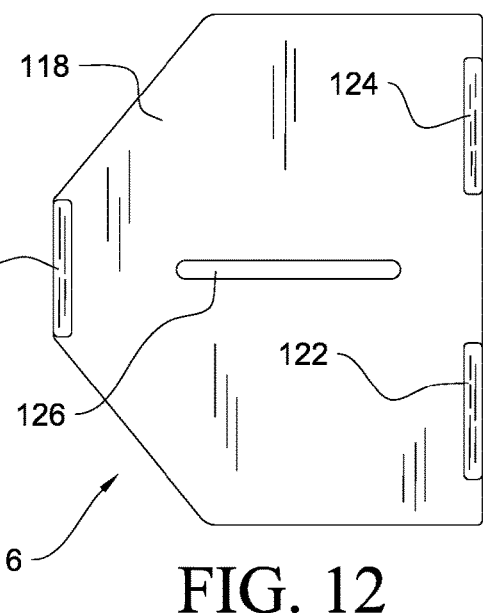
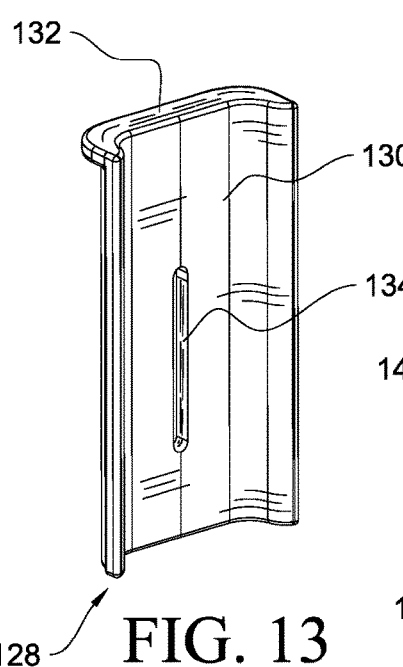
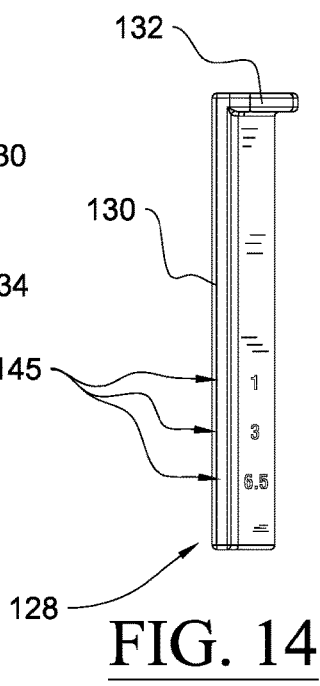
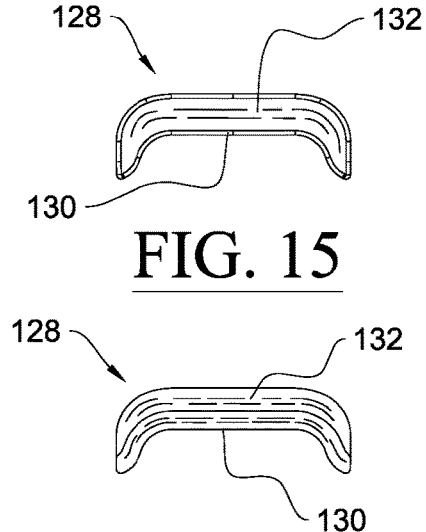

US 10,894,938 B1

DEVICE FOR TILTING A CARBOY

CROSS-REFERENCE TO RELATED APPLICATIONS

This patent application claims priority to, and incorporates by reference in its entirety, U.S. Provisional Patent Application No. 62/831,113, entitled "Device For Tilting A Carboy", filed on Apr. 8, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a device for tilting a carboy. More particularly, the invention relates to an adjustable device for supporting carboys of different sizes in tilted positions.

2. Background

During the process of making wine, it is necessary for the home winemaker to rack their wine from one carboy to another several times or more in order to produce a clear and good quality wine. The purpose of racking wine is to collect the maximum amount of wine leaving behind the sediment that has accumulated. It is very important to rack the wine off this sediment to prevent it from giving off-flavors to the wine. The racking process is repeated as necessary when more sediment has accumulated. With each successive racking, less sediment will accumulate. At some point during the racking process, the carboy must be tilted in order to gather the last portion of wine in one place to transfer it into the receiving carboy.

The process of tilting a carboy is done by holding the neck, and then carefully sliding the fingers of the other hand under it (the sides of the bottom are slightly rounded) and gently tilting it to the side. Now, while holding the carboy at the desired angle and without moving it, the other hand is used to place something under the carboy to maintain the angle. Of course the goal here is to do this very carefully and slowly and not slosh the wine about which would disturb the sediment. The sediment is often very light and fluffy, and easily disturbed by the slightest movement; also, the carboy is heavy, awkward to handle, and may be slippery.

During the racking process, it is necessary to tilt the carboy at an angle of approximately 12 degrees to 18 degrees in order to collect the maximum amount of wine off the sediment. It is not necessary to tilt the carboy as soon as racking is started; however, the more wine in the carboy when tilting, the less likely any sediment will be disturbed.

The process of tilting a carboy can be challenging to do without disturbing the sediment. A full 6.5-gallon glass carboy weighs nearly 70 pounds and can be very slippery and difficult to handle.

There are various problems that are encountered when tilting the carboy during the racking process. First of all, it is difficult to gently tilt a carboy during the racking process without disturbing the sediment because the sediment is often light and fluffy and easily disturbed. Also, once the carboy is tilted, the sediment may be disturbed while placing something under the carboy to keep it tilted. Once the sediment has been disturbed, it reduces the amount of clear wine that may be transferred to the receiving carboy. In addition, if the carboy is not supported properly, it could slip and potentially be dangerous to the winemaker.

Conventional carboy wedges are known that are placed under the carboy to tilt it. However, conventional carboy wedges have numerous limitations and drawbacks. While these carboy wedges will tilt the carboy, they do not provide a safe or secure way, thus leaving them susceptible to slipping. Because of these shortcomings with conventional carboy wedges, many winemakers just use a book, a piece of wood (e.g., a piece of 2×4), or anything they else they can find that will fit under the carboy, which may be even less secure that the conventional carboy wedges. Depending on how well the winemaker has supported the carboy, it may be resting precariously and susceptible to slipping. Of course not only would this disturb the sediment, but more seriously, it could be dangerous to the winemaker.

Therefore, what is needed is a device for tilting a carboy that provides the capability for a carboy to be easily and safely tilted to a range of angles for racking off the sediment. Moreover, a device for tilting a carboy is needed that provides the capability to tilt the carboy with little effort, and without assistance from another person. Furthermore, there is a need for a device for tilting a carboy that allows the carboy to be tilted at various angles in a safe and controlled manner, and without disturbing the sediment.

BRIEF SUMMARY OF EMBODIMENTS OF THE INVENTION

Accordingly, the present invention is directed to a device for tilting a carboy that substantially obviates one or more problems resulting from the limitations and deficiencies of the related art.

In accordance with one or more embodiments of the present invention, there is provided a device for tilting a carboy that includes an L-shaped body portion configured to receive a carboy thereon, the L-shaped body portion including a platform base and an upright support connected to one end of the platform base, the platform base configured to support a bottom wall of the carboy, and the upright support configured to support a side wall of the carboy; and a leg structure adjustably coupled to the L-shaped body portion, the leg structure including one or more downwardly extending legs, and the leg structure configured to be slidably adjustable relative to the L-shaped body portion so as to accommodate carboys of different sizes in tilted positions.

In a further embodiment of the present invention, the upright support of the L-shaped body portion has a concave interior surface that is configured to accommodate a curved side wall of the carboy supported on the L-shaped body portion.

In yet a further embodiment, the leg structure of the L-shaped body portion further comprises a top plate component slidably coupled to the platform base of the L-shaped body portion, and the one or more downwardly extending legs comprise a plurality of legs extending downwardly from a bottom surface of the top plate component.

In still a further embodiment, the device further comprises a first tightening knob adjustably coupling the top plate component of the leg structure to the platform base of the L-shaped body portion, the first tightening knob configured to fix a position of the leg structure relative to the platform base of the L-shaped body portion after the position of the leg structure has been selectively adjusted by a user.

In yet a further embodiment, a side of the platform base of the L-shaped body portion comprises indicia printed thereon, the indicia denoting a plurality of different carboy sizes so as to facilitate the correct positioning of the leg structure along the length of the platform base.

In still a further embodiment, the device further comprises a vertically adjustable leg coupled to the L-shaped body portion, the vertically adjustable leg configured to be slidably adjustable relative to the upright support of the L-shaped body portion so as to accommodate the carboys of different sizes in the tilted positions.

In yet a further embodiment, the device further comprises a second tightening knob adjustably coupling the vertically adjustable leg to the upright support of the L-shaped body portion, the second tightening knob configured to fix a position of the vertically adjustable leg relative to the upright support of the L-shaped body portion after the position of the vertically adjustable leg has been selectively adjusted by a user.

In still a further embodiment, an outer surface of the vertically adjustable leg comprises indicia printed thereon, the indicia denoting a plurality of different carboy sizes so as to facilitate the correct positioning of the vertically adjustable leg along the length of the upright support of the L-shaped body portion.

In yet a further embodiment, the vertically adjustable leg comprises a protruding rim extending outwardly from a top end of the vertically adjustable leg, the protruding rim configured to facilitate a grasping of the vertically adjustable leg by a user so as to facilitate the positioning of the vertically adjustable leg along the length of the upright support of the L-shaped body portion.

In accordance with one or more other embodiments of the present invention, there is provided a device for tilting a carboy that includes an L-shaped body portion configured to receive a carboy thereon, the L-shaped body portion including a platform base and an upright support connected to one end of the platform base, the platform base configured to support a bottom wall of the carboy, and the upright support configured to support a side wall of the carboy; a horizontally adjustable leg structure coupled to the L-shaped body portion, the horizontally adjustable leg structure including one or more downwardly extending legs, and the horizontally adjustable leg structure configured to be slidably adjustable relative to the platform base of the L-shaped body portion so as to accommodate carboys of different sizes in tilted positions; and a vertically adjustable leg coupled to the L-shaped body portion, the vertically adjustable leg configured to be slidably adjustable relative to the upright support of the L-shaped body portion so as to accommodate the carboys of different sizes in the tilted positions.

In a further embodiment of the present invention, the upright support of the L-shaped body portion has a concave interior surface that is configured to accommodate a curved side wall of the carboy supported on the L-shaped body portion.

In yet a further embodiment, the horizontally adjustable leg structure of the L-shaped body portion further comprises a top plate component slidably coupled to the platform base of the L-shaped body portion, and the one or more downwardly extending legs comprise a plurality of legs extending downwardly from a bottom surface of the top plate component.

In still a further embodiment, the device further comprises a first tightening knob adjustably coupling the top plate component of the horizontally adjustable leg structure to the platform base of the L-shaped body portion, the first tightening knob configured to fix a position of the horizontally adjustable leg structure relative to the platform base of the L-shaped body portion after the position of the horizontally adjustable leg structure has been selectively adjusted by a user.

In yet a further embodiment, a side of the platform base of the L-shaped body portion comprises indicia printed thereon, the indicia denoting a plurality of different carboy sizes so as to facilitate the correct positioning of the leg structure along the length of the platform base.

In still a further embodiment, the device further comprising a second tightening knob adjustably coupling the vertically adjustable leg to the upright support of the L-shaped body portion, the second tightening knob configured to fix a position of the vertically adjustable leg relative to the upright support of the L-shaped body portion after the position of the vertically adjustable leg has been selectively adjusted by a user.

In yet a further embodiment, an outer surface of the vertically adjustable leg comprises indicia printed thereon, the indicia denoting a plurality of different carboy sizes so as to facilitate the correct positioning of the vertically adjustable leg along the length of the upright support of the L-shaped body portion.

In still a further embodiment, the vertically adjustable leg comprises a protruding rim extending outwardly from a top end of the vertically adjustable leg, the protruding rim configured to facilitate a grasping of the vertically adjustable leg by a user so as to facilitate the positioning of the vertically adjustable leg along the length of the upright support of the L-shaped body portion.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a top-side assembled perspective view of the device of FIG. 1;

FIG. 3 is a bottom-side assembled perspective view of the device of FIG. 1;

FIG. 4 is a front elevational view of the device of FIG. 1;

FIG. 5 is a rear elevational view of the device of FIG. 1;

FIG. 6 is a side elevational view of the device of FIG. 1;

FIG. 9 is a perspective view of the horizontally adjustable leg structure of the device of FIG. 1;

FIG. 10 is a front elevational view of the horizontally adjustable leg structure of FIG. 9;

FIG. 11 is a side elevational view of the horizontally adjustable leg structure of FIG. 9;

FIG. 12 is a bottom plan view of the horizontally adjustable leg structure of FIG. 9;

FIG. 13 is a perspective view of the vertically adjustable leg of the device of FIG. 1;

FIG. 14 is a side elevational view of the vertically adjustable leg of FIG. 13;

FIG. 15 is a top plan view of the vertically adjustable leg of FIG. 13;

FIG. 16 is a bottom plan view of the vertically adjustable leg of FIG. 13;

Throughout the figures, the same parts are always denoted using the same reference characters so that, as a general rule, they will only be described once.

DETAILED DESCRIPTION OF EMBODIMENTS OF THE INVENTION

Figure 1:
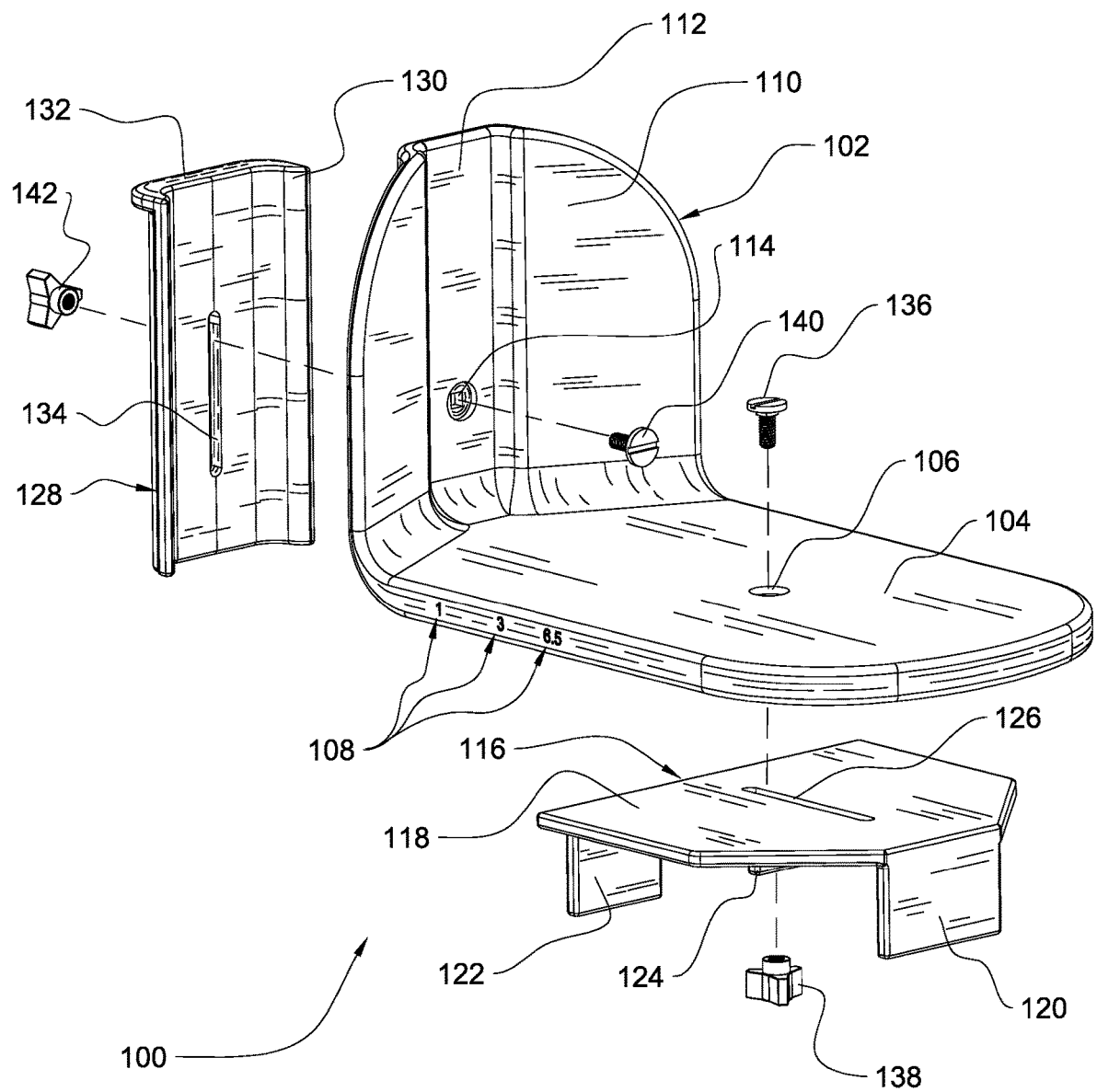
FIG. 1 is an exploded perspective view of a device for tilting a carboy, according to an illustrative embodiment of the invention.
Figure 7:
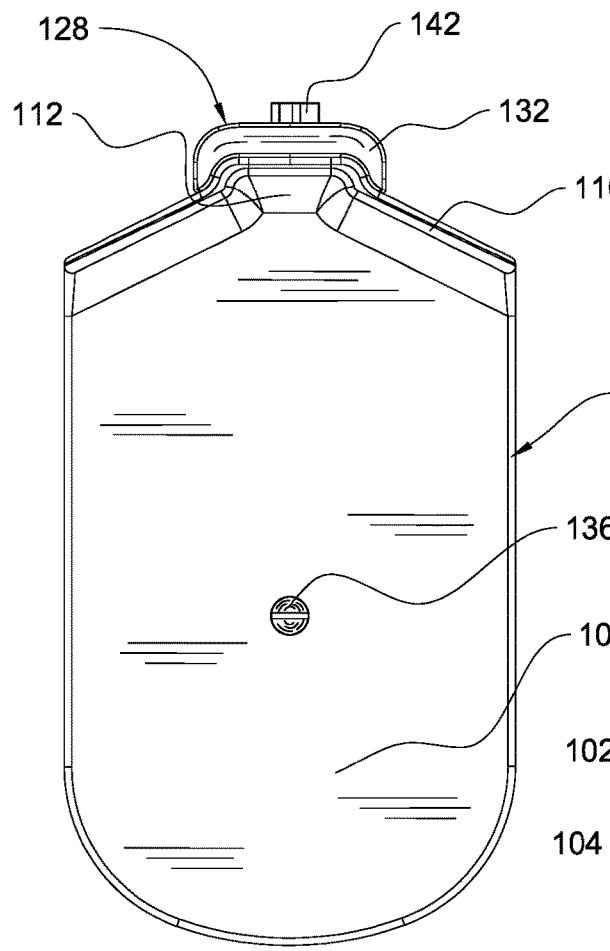
FIG. 7 is a top plan view of the device of FIG. 1.
Figure 8:
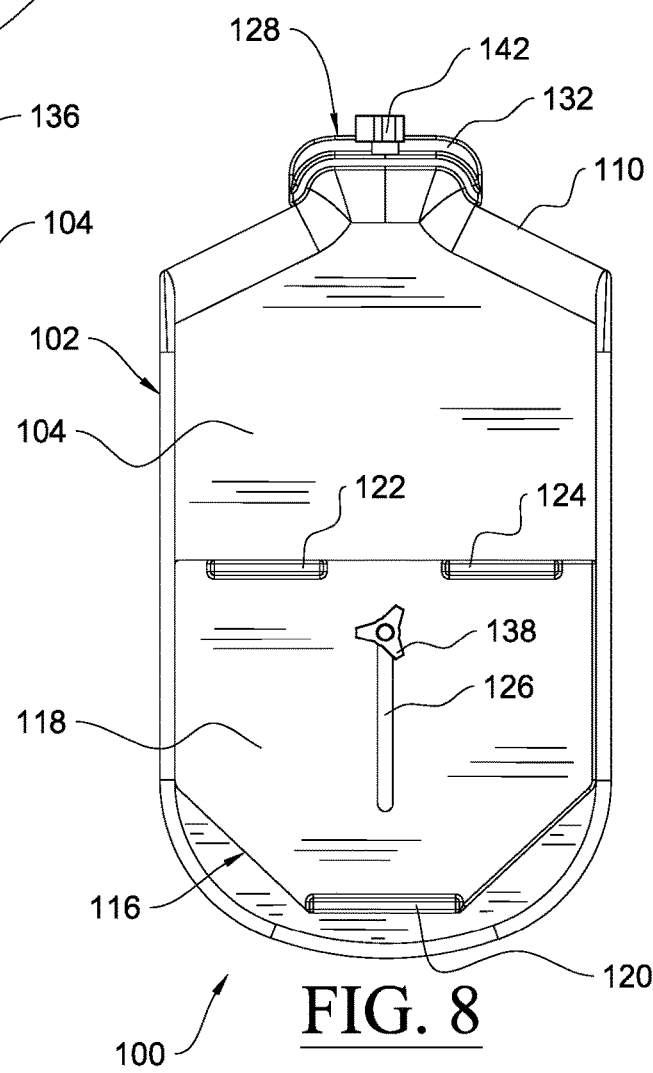
FIG. 8 is a bottom plan view of the device of FIG. 1.

An illustrative embodiment of a device for tilting a carboy is seen generally at 100 in FIGS. 1-8. With initial reference to FIGS. 1-3, it can be seen that the device 100 generally comprises an L-shaped body portion 102 configured to receive a carboy 146, 148 thereon (see FIGS. 17-20), the L-shaped body portion 102 including a platform base 104 and an upright support 110 connected to one end of the platform base 104, the platform base 104 configured to support a bottom wall of the carboy 146, 148 (see FIGS. 17-20), and the upright support 110 configured to support a side wall of the carboy 146, 148; a horizontally adjustable leg structure 116 coupled to the L-shaped body portion 102, the horizontally adjustable leg structure 116 including a plurality of downwardly extending legs 120, 122, 124 (see FIG. 3), and the horizontally adjustable leg structure 116 configured to be slidably adjustable relative to the platform base 104 of the L-shaped body portion 102 so as to accommodate carboys 146, 148 of different sizes in tilted positions (see FIGS. 17-20); and a vertically adjustable leg 128 coupled to the L-shaped body portion 102, the vertically adjustable leg 128 configured to be slidably adjustable relative to the upright support 110 of the L-shaped body portion 102 so as to accommodate the carboys 146, 148 of different sizes in the tilted positions (see FIGS. 17-20).

Referring to FIGS. 1 and 2, it can be seen that, in the illustrative embodiment, the upright support 110 of the L-shaped body portion 102 of the device 100 has a concave interior surface with a center recessed portion 112. The outer portions of the concave interior surface, which are disposed on opposite sides of the center recessed portion 112, are configured to accommodate a curved side wall of the carboy 146, 148 supported on the L-shaped body portion 102 (see FIGS. 17-20).

Now, with reference again to FIGS. 1 and 3 of the illustrative embodiment, it can be seen that the horizontally adjustable leg structure 116 of the L-shaped body portion 102 further comprises a top plate component 118 slidably coupled to the platform base 104 of the L-shaped body portion 102. In the illustrative embodiment, as shown in FIGS. 3 and 9-12, each of the legs 120, 122, 124 of the horizontally adjustable leg structure 116 extend downwardly from a bottom surface of the top plate component 118, and each of the legs 120, 122, 124 are disposed generally perpendicular, or perpendicular to the top plate component 118. The first leg 120 is disposed on the front side of the leg structure 116, while the second and third legs 122, 124 are disposed on the rear side of the leg structure 116 (see FIGS. 3 and 9). In the illustrative embodiment, the second and third legs 122, 124 are disposed next to one another, and are aligned on the rear side of the leg structure 116 (refer to FIGS. 3 and 12).

Turning again to FIGS. 1 and 3, it can be seen that, in the illustrative embodiment, the device 100 further comprises a first tightening knob 138 adjustably coupling the top plate component 118 of the horizontally adjustable leg structure 116 to the platform base 104 of the L-shaped body portion 102. The first tightening knob 138 is configured to fix a position of the horizontally adjustable leg structure 116 relative to the platform base 104 of the L-shaped body portion 102 after the position of the horizontally adjustable leg structure 116 has been selectively adjusted by a user. As shown in these figures, a fastener member 136 (e.g., a screw 136) with external threads threadingly engages internal threads on the first tightening knob 138 so as to adjustably couple the horizontally adjustable leg structure 116 to the platform base 104 of the L-shaped body portion 102. More specifically, in the illustrative embodiment, the threaded shaft of the fastener member 136 passes through a fastener aperture 106 in the platform base 104 and an elongate slot 126 in the top plate component 118 of the leg structure 116, and the knob 138 threadingly engages the distal end of the fastener member 136 to secure the leg structure 116 to the platform base 104 (refer to FIGS. 1 and 3). The elongate slot 126 in the top plate component 118 of the leg structure 116 allows the leg structure 116 to be slid relative to the platform base 104 when the knob 136 is loosened slightly, thus allowing a user to select the desired position of the leg structure 116 relative to the platform base 104. Then, once the desired position of the leg structure 116 is selected by the user, the knob 138 is tightened so as to fix the position of the leg structure 116.

Figure 17:
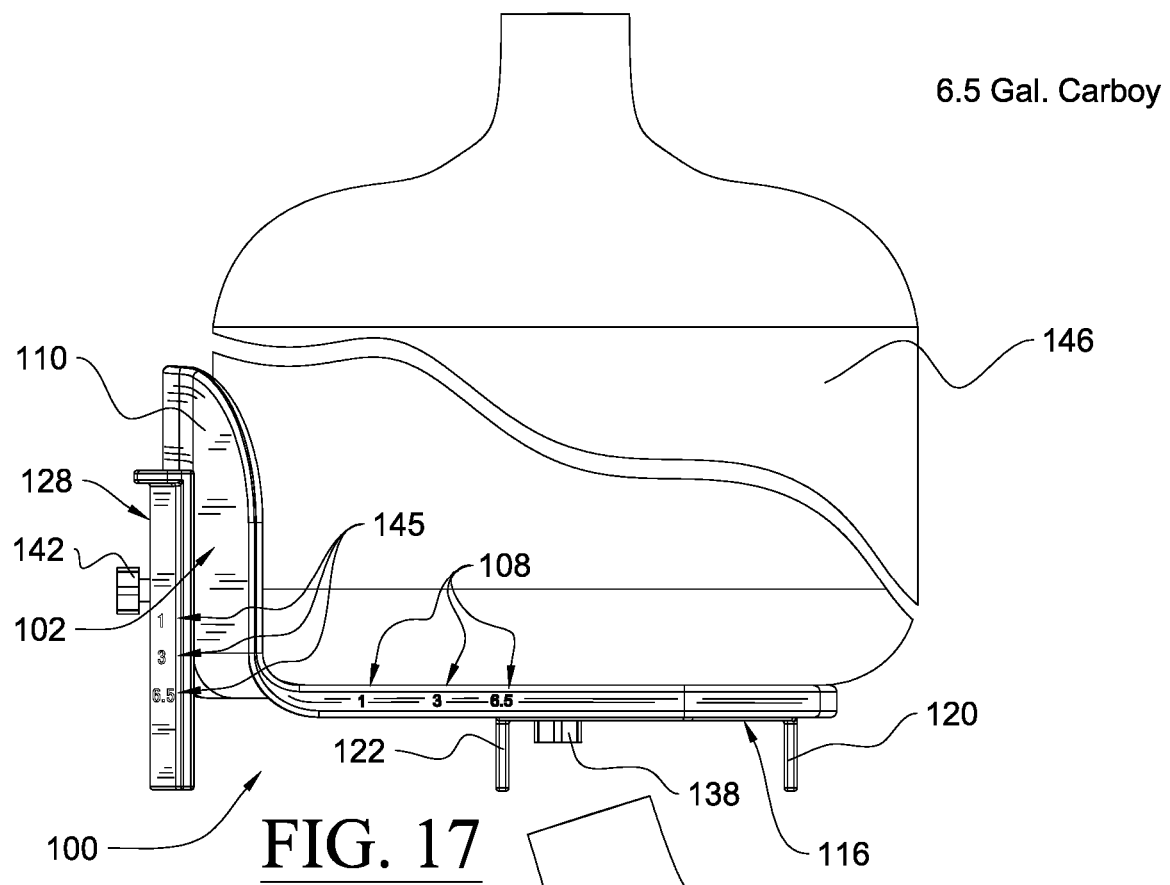
FIG. 17 is a perspective view illustrating the device of FIG. 1 being used to hold a carboy having a first size in a generally upright position.
Figure 18:
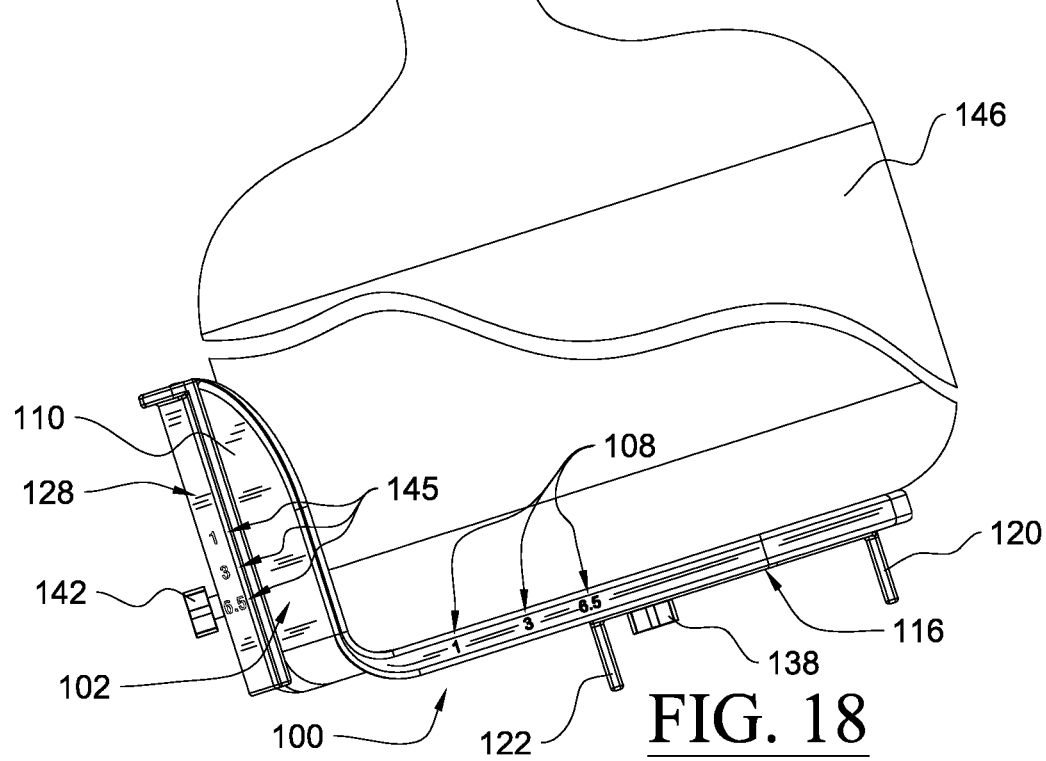
FIG. 18 is a perspective view illustrating the device of FIG. 1 being used to hold the carboy having the first size in a tilted position.
Figure 19:
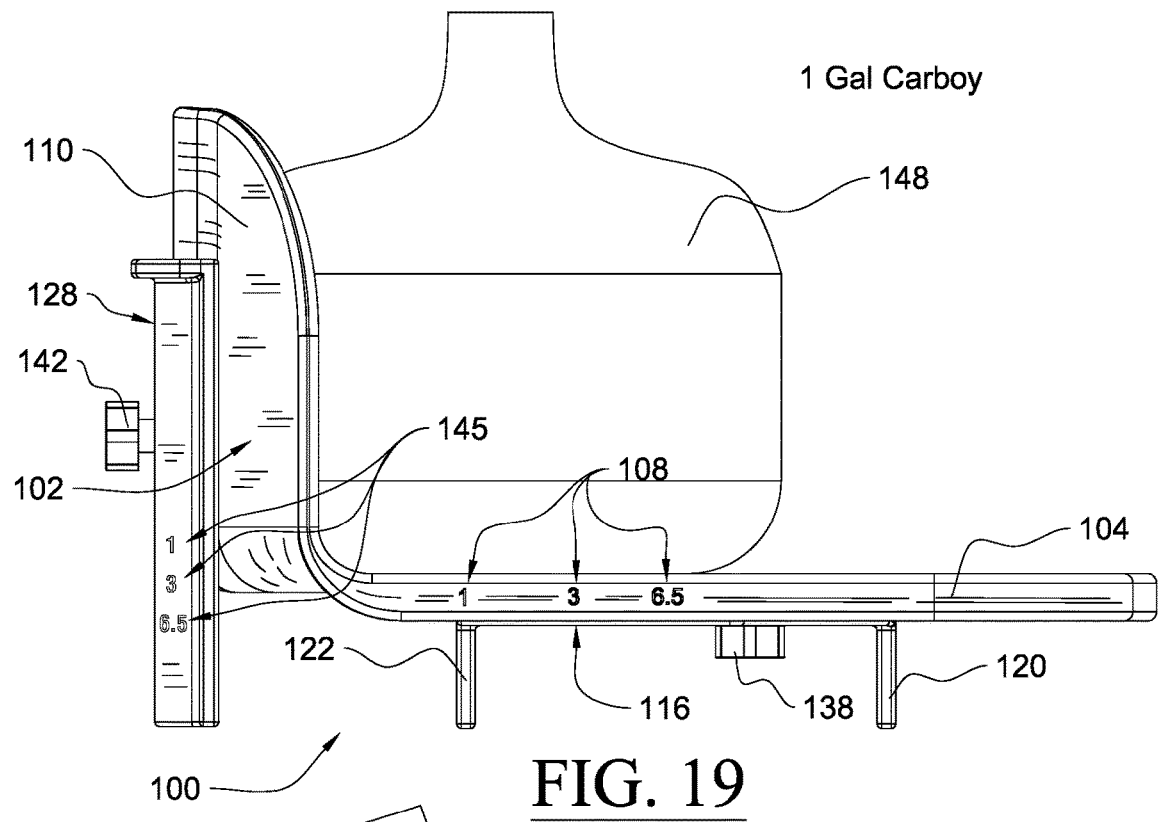
FIG. 19 is a perspective view illustrating the device of FIG. 1 being used to hold a carboy having a second size in a generally upright position.
Figure 20:
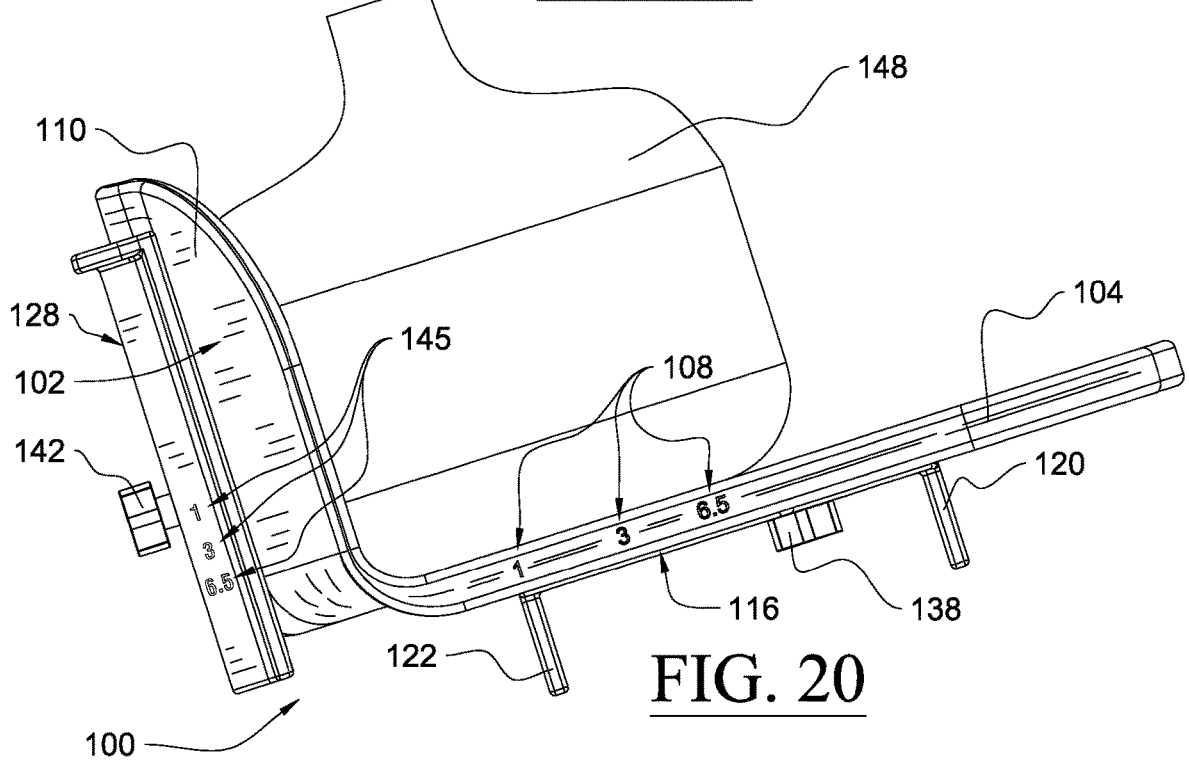
FIG. 20 is a perspective view illustrating the device of FIG. 1 being used to hold the carboy having the second size in a tilted position.

In the illustrative embodiment, with reference to FIGS. 1, 3, and 6, it can be seen that a side of the platform base 104 of the L-shaped body portion 102 comprises indicia 108 printed thereon. The indicia 108 may denote a plurality of different carboy sizes so as to facilitate the correct positioning of the leg structure 116 along the length of the platform base 104. For example, in the illustrative embodiment, the indicia may include a first numeral "1" denoting a 1-gallon carboy, a second numeral "3" denoting a 3-gallon carboy, and a third numeral "6.5" denoting a 6.5-gallon carboy. As shown in FIGS. 17 and 18, when a user is using the device 100 to tilt a 6.5-gallon carboy 146, he or she aligns the second leg 122 of the leg structure 116 with the third numeral "6.5" of the indicia 108 on the side of the platform base 104 of the L-shaped body portion 102. Similarly, as shown in FIGS. 19 and 20, when a user is using the device 100 to tilt a 1-gallon carboy 148, he or she aligns the second leg 122 of the leg structure 116 with the first numeral "1" of the indicia 108 on the side of the platform base 104 of the L-shaped body portion 102. In a similar manner, when a user is using the device 100 to tilt a 3-gallon carboy, he or she aligns the second leg 122 of the leg structure 116 with the second numeral "3" of the indicia 108 on the side of the platform base 104 of the L-shaped body portion 102. Advantageously, the indicia 108 on the side of the platform base 104 makes it easier for a user to properly position the leg structure 116 when using the device 100 with a carboy of a standard size (i.e., a 1-gallon, 3-gallon, or 6.5-gallon carboy).

In an alternative embodiment, rather than the platform base 104 having a downturned lip disposed about its periphery (see e.g., FIGS. 2 and 3), the platform base 104 may be formed as a plate-like structure of generally uniform thickness. For example, in this alternative embodiment, the L-shaped body portion 102 that includes the platform base 104 may be formed out of metal (e.g., by stamping or another suitable technique).

Next, with particular reference to FIGS. 1, 3, and 13-16, the details of the vertically adjustable leg 128 of the illustrative embodiment will be described. As shown in these figures, the vertically adjustable leg 128 of the device 100 comprises a concave body portion 130 that corresponds to the convex shape of the rear side of the upright support 110 of the L-shaped body portion 102. Referring again to these figures, it can be seen that the vertically adjustable leg 128 further comprises a protruding rim 132 extending outwardly from a top end of the vertically adjustable leg 128. The protruding rim 132 is configured to facilitate a grasping of the vertically adjustable leg 128 by a user so as to facilitate the positioning of the vertically adjustable leg 128 along the length of the upright support 110 of the L-shaped body portion 102.

Turning again to FIGS. 1 and 3, it can be seen that, in the illustrative embodiment, the device 100 further comprises a second tightening knob 142 adjustably coupling the concave body portion 130 of the vertically adjustable leg 128 to the upright support 110 of the L-shaped body portion 102. The second tightening knob 142 is configured to fix a position of the vertically adjustable leg 128 relative to the upright support 110 of the L-shaped body portion 102 after the position of the vertically adjustable leg 128 has been selectively adjusted by a user. As shown in these figures, a fastener member 140 (e.g., a screw 140) with external threads threadingly engages internal threads on the second tightening knob 142 so as to adjustably couple the vertically adjustable leg 128 to the upright support 110 of the L-shaped body portion 102. More specifically, in the illustrative embodiment, the threaded shaft of the fastener member 140 passes through a counterbore fastener aperture 114 in the upright support 110 and an elongate slot 134 in the body portion 130 of the vertically adjustable leg 128, and the knob 142 threadingly engages the distal end of the fastener member 140 to secure the vertically adjustable leg 128 to the upright support 110 (refer to FIGS. 1 and 3). The elongate slot 134 in the body portion 130 of the vertically adjustable leg 128 allows the leg 128 to be slid relative to the upright support 110 when the knob 142 is loosened slightly, thus allowing a user to select the desired position of the leg 128 relative to the upright support 110. Then, once the desired position of the vertically adjustable leg 128 is selected by the user, the knob 142 is tightened so as to fix the position of the leg 128.

In the illustrative embodiment, with reference to FIGS. 3, 5, 6, 14, and 17-20, it can be seen that the outer rear surface of the vertically adjustable leg 128 comprises indicia 144, 145 printed thereon (e.g., on the rear and/or side(s) of the outer surface). The indicia 144, 145 may denote a plurality of different carboy sizes so as to facilitate the correct positioning of the vertically adjustable leg 128 along the length of the upright support 110 of the L-shaped body portion 102. For example, in the illustrative embodiment, the indicia may include a first numeral "1" denoting a 1-gallon carboy, a second numeral "3" denoting a 3-gallon carboy, and a third numeral "6.5" denoting a 6.5-gallon carboy. As shown in the tilted position of FIG. 18, when a user is using the device 100 to tilt a 6.5-gallon carboy 146, he or she generally aligns the axial centerline of the knob 142 with the third numeral "6.5" of the indicia 145 on the outer surface of the vertically adjustable leg 128. Similarly, as shown in the tilted view of FIG. 20, when a user is using the device 100 to tilt a 1-gallon carboy 148, he or she generally aligns the axial centerline of the knob 142 with the first numeral "1" of the indicia 145 on the outer surface of the vertically adjustable leg 128. In a similar manner, when a user is using the device 100 to tilt a 3-gallon carboy, he or she generally aligns the axial centerline of the knob 142 with the second numeral "3" of the indicia 144, 145 on the outer surface of the vertically adjustable leg 128. Advantageously, the indicia 144, 145 on the outer rear surface of the vertically adjustable leg 128 makes it easier for a user to properly position the vertically adjustable leg 128 when using the device 100 with a carboy of a standard size (i.e., a 1-gallon, 3-gallon, or 6.5-gallon carboy).

In an alternative embodiment, a plurality of vertically adjustable legs may be provided, rather than the single adjustable vertical leg 128 of the illustrative embodiment. For example, two vertical leg portions separated by notch could be provided as part of a single component slidably coupled to the upright support 110.

As described above, in the illustrative embodiment, the device 100 generally comprises an L-shaped body portion 102 supported on a horizontally adjustable leg structure 116 and a vertically adjustable leg 128. In the illustrative embodiment, each of the legs 120, 122, 124 are approximately one and one-half (1½) inches tall. The platform base 104 is appropriately sized for the different sized carboys to be placed upon. For example, in the illustrative embodiment, the length of the platform base 104 of the L-shaped body portion 102 is approximately twelve (12) inches, slightly longer than the bottom diameter of a large 6.5-gallon carboy. In the illustrative embodiment, the width of the platform base 104 may be approximately six (6) inches or wide enough to keep the carboy stable. On the one end of the platform base 104, the upright support 110 of the L-shaped body portion 102 rises from the platform base 104 approximately five (5) inches, tall enough and amply shaped to keep various size carboys stable when tilted. The upright support 110 may have a curvature so that the outer portions of the curved upright support 110 on the opposite sides of the middle recessed portion 112 touch and support the different size carboys (e.g., 1, 3, 5, and 6.5-gallon carboys). The horizontally adjustable leg structure 116 is placed under the platform base 104 with the capability to slide and be positioned to accommodate the pivot point of various size carboys. The vertically adjustable leg 128 on the one end of the platform base 104 may be adjusted to achieve a particular tilt angle. In the illustrative embodiment, the height and placement of the legs 120, 122, 124, 128 is such that, when the legs 120, 122, 124, 128 are adjusted for various carboy sizes, they tilt to achieve an angle of between approximately 12 degrees and 18 degrees. When not in the tilted position and the vertically adjustable leg 128 is secured, this leg 128 may be combined with the other legs 120, 122, 124 on the leg structure 116 to provide a steady and secure foundation for the carboy.

The device 100 is configured to have a platform base 104 to place the carboy on before the racking process begins. The legs 120, 122, 124, 128 support the device 100 and carboy until it is time for the carboy to be tilted. In the illustrative embodiment, the pair of legs 122, 124 is positioned under the carboy near the balancing point (center of gravity). When tilting the carboy, these legs 122, 124 become the pivot point on which the carboy is tilted to the desired angle. The vertically adjustable leg 128 is used to keep the carboy steady until it is time to tilt the carboy. When tilting the carboy, this vertical leg 128 is adjusted to allow the carboy to be tilted. The adjustable horizontal pivot legs 122, 124 combined with the adjustable vertical leg 128 provides the capability for the carboy to be easily tilted to the desired angle for the various carboy sizes. Once the carboy has been tilted, the pivot point legs 122, 124 and the vertically adjustable leg 128 provide a very stable and secure platform for the carboy.

To use the device 100 of the illustrative embodiment, with the vertical leg 128 in the full up position, secure the leg 128 using knob 142. Use an empty carboy to adjust the pivot point legs 122, 124 of the horizontally adjustable leg structure 116 to be near the balancing point of the carboy to be tilted, but not so close it will tilt on its own, and then secure the horizontally adjustable leg structure 116 with knob 138. The closer these legs 122, 124 are to the balancing point, the more easily the carboy can be tilted. Loosen knob 142 so vertical leg 128 is free to move and tilt the carboy to the desired angle when racking off the sediment and take note of its position. This is where the vertical leg 128 will be adjusted later when tilting the carboy. When ready to rack, adjust the vertical leg 128 to the full down position and secure with knob 142. Place the carboy on the platform base 104 of the L-shaped body portion 102, making sure it is centered and touching the upright support 110. When it is time for the carboy to be tilted, loosen knob 142 and adjust the vertical leg 128 to the position previously determined for the desired angle, and secure. Slowly tilt the carboy to rest on the vertical leg 128. The carboy is now resting steady and secure at the desired angle ready for the wine to be racked off the sediment.

In one or more embodiments, the primary components of the device 100 may be formed from solid plastic by injection molding (e.g., the L-shaped body portion 102, the horizontally adjustable leg structure 116, and the vertically adjustable leg 128). However, in alternative embodiments, vacuum forming may also be used to form one or more components of the device 100 (e.g., the L-shaped body portion 102 of the device 100). Further, in other alternative embodiments, one or more components of the device 100 may be formed from metal by a stamping technique or other suitable metal forming technique.

In one or more embodiments, the device 100 does not include a hinge or wheels of any kind to facilitate the tilting of the carboy. Also, in one or more embodiments, the device 100 does not include a jack adjustment mechanism of any kind (e.g., no screw jack is provided in the device 100).

It is readily apparent that the aforedescribed device for tilting a carboy 100 offers numerous advantages. First, the device 100 provides the capability for a carboy to be easily and safely tilted to a range of angles for racking off the sediment. Secondly, the device 100 provides the capability to tilt the carboy with little effort, and without assistance from another person. Finally, the device 100 allows the carboy to be tilted at various angles in a safe and controlled manner, and without disturbing the sediment. Once the carboy has been tilted using the device 100, the carboy remains steady and secure, and is not susceptible to slipping or moving. Also, as described above, the device 100 accommodates various size carboys (i.e., the device 100 accommodates the location of the center-of-gravity on various size carboys). The L-shaped body portion 102 of the device 100 on which the carboy is placed provides the capability for the carboy to be easily and safely tilted to a range of angles for racking off the sediment. The capability of the L-shaped body portion 102 to be tilted is achieved by the horizontally adjustable leg structure 116 and the vertically adjustable leg 128 described above in the illustrative embodiment.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A device for tilting a carboy, the device comprising:
an L-shaped body portion configured to receive a carboy thereon, the L-shaped body portion including a platform base and an upright support connected to one end of the platform base, the platform base configured to support a bottom wall of the carboy, and the upright support configured to support a side wall of the carboy; and
a leg structure adjustably coupled to the L-shaped body portion, the leg structure including one or more downwardly extending legs, and the leg structure configured to be slidably adjustable relative to the L-shaped body portion so as to accommodate carboys of different sizes in tilted positions.

2. The device according to claim 1, wherein the upright support of the L-shaped body portion has a concave interior surface that is configured to accommodate a curved side wall of the carboy supported on the L-shaped body portion.

3. The device according to claim 1, wherein the leg structure of the device further comprises a top plate component slidably coupled to the platform base of the L-shaped body portion, and wherein the one or more downwardly extending legs comprise a plurality of legs extending downwardly from a bottom surface of the top plate component.

4. The device according to claim 3, further comprising a tightening knob with a fastener member adjustably coupling the top plate component of the leg structure to the platform base of the L-shaped body portion, the tightening knob configured to fix a position of the leg structure relative to the platform base of the L-shaped body portion after the position of the leg structure has been selectively adjusted by a user.

5. The device according to claim 1, wherein a side of the platform base of the L-shaped body portion comprises indicia printed thereon, the indicia denoting a plurality of different carboy sizes so as to facilitate the correct positioning of the leg structure along the length of the platform base.

6. The device according to claim 1, further comprising a vertically adjustable leg coupled to the L-shaped body portion, the vertically adjustable leg configured to be slidably adjustable relative to the upright support of the L-shaped body portion so as to accommodate the carboys of different sizes in the tilted positions.

7. The device according to claim 6, further comprising a tightening knob with a fastener member adjustably coupling the vertically adjustable leg to the upright support of the L-shaped body portion, the tightening knob configured to fix a position of the vertically adjustable leg relative to the upright support of the L-shaped body portion after the position of the vertically adjustable leg has been selectively adjusted by a user.

8. The device according to claim 6, wherein an outer surface of the vertically adjustable leg comprises indicia printed thereon, the indicia denoting a plurality of different carboy sizes so as to facilitate the correct positioning of the vertically adjustable leg along the length of the upright support of the L-shaped body portion.

9. The device according to claim 6, wherein the vertically adjustable leg comprises a protruding rim extending outwardly from a top end of the vertically adjustable leg, the protruding rim configured to facilitate a grasping of the vertically adjustable leg by a user so as to facilitate the positioning of the vertically adjustable leg along the length of the upright support of the L-shaped body portion.

10. A device for tilting a carboy, the device comprising:
an L-shaped body portion configured to receive a carboy thereon, the L-shaped body portion including a platform base and an upright support connected to one end of the platform base, the platform base configured to support a bottom wall of the carboy, and the upright support configured to support a side wall of the carboy;
a horizontally adjustable leg structure coupled to the L-shaped body portion, the horizontally adjustable leg structure including one or more downwardly extending legs, and the horizontally adjustable leg structure configured to be slidably adjustable relative to the platform base of the L-shaped body portion so as to accommodate carboys of different sizes in tilted positions; and
a vertically adjustable leg coupled to the L-shaped body portion, the vertically adjustable leg configured to be slidably adjustable relative to the upright support of the L-shaped body portion so as to accommodate the carboys of different sizes in the tilted positions.

11. The device according to claim 10, wherein the upright support of the L-shaped body portion has a concave interior surface that is configured to accommodate a curved side wall of the carboy supported on the L-shaped body portion.

12. The device according to claim 10, wherein the horizontally adjustable leg structure of the device further comprises a top plate component slidably coupled to the platform base of the L-shaped body portion, and wherein the one or more downwardly extending legs comprise a plurality of legs extending downwardly from a bottom surface of the top plate component.

13. The device according to claim 12, further comprising a tightening knob with a fastener member adjustably coupling the top plate component of the horizontally adjustable leg structure to the platform base of the L-shaped body portion, the tightening knob configured to fix a position of the horizontally adjustable leg structure relative to the platform base of the L-shaped body portion after the position of the horizontally adjustable leg structure has been selectively adjusted by a user.

14. The device according to claim 10, wherein a side of the platform base of the L-shaped body portion comprises indicia printed thereon, the indicia denoting a plurality of different carboy sizes so as to facilitate the correct positioning of the horizontally adjustable leg structure along the length of the platform base.

15. The device according to claim 10, further comprising a tightening knob with a fastener member adjustably coupling the vertically adjustable leg to the upright support of the L-shaped body portion, the tightening knob configured to fix a position of the vertically adjustable leg relative to the upright support of the L-shaped body portion after the position of the vertically adjustable leg has been selectively adjusted by a user.

16. The device according to claim 10, wherein an outer surface of the vertically adjustable leg comprises indicia printed thereon, the indicia denoting a plurality of different carboy sizes so as to facilitate the correct positioning of the vertically adjustable leg along the length of the upright support of the L-shaped body portion.

17. The device according to claim 10, wherein the vertically adjustable leg comprises a protruding rim extending outwardly from a top end of the vertically adjustable leg, the protruding rim configured to facilitate a grasping of the vertically adjustable leg by a user so as to facilitate the positioning of the vertically adjustable leg along the length of the upright support of the L-shaped body portion.

* * * * *